(12) United States Patent
Lu (10) Patent No.: US 12,547,306 B2
(45) Date of Patent: Feb. 10, 2026

(54) VIDEO PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Zhixiong Lu, Beijing (CN)

(73) Assignee: Beijing Zitiao Network Technology Co., Ltd., Beijing (BR)

( * ) Notice: Subject to any disclaimer, the term of this patent is extended or adjusted under 35 U.S.C. 154(b) by 17 days.

(21) Appl. No.: 18/505,738

(22) Filed: Nov. 9, 2023

(65) Prior Publication Data

US 2024/0152261 A1 May 9, 2024

(30) Foreign Application Priority Data

Nov. 9, 2022 (CN) .......................... 202211401216.X (51) Int. Cl.
*G06F 3/04845* (2022.01)
*G06F 3/0482* (2013.01)
(Continued)

(52) U.S. Cl.
CPC ........ *G06F 3/04845* (2013.01); *G06F 3/0482* (2013.01); *G06F 3/0487* (2013.01);
(Continued)

(58) Field of Classification Search
CPC .. G06F 3/04845; G06F 3/0482; G06F 3/0487; G06F 40/279; G06V 10/764;
(Continued)

(56) References Cited

U.S. PATENT DOCUMENTS

2011/0050687 A1* 3/2011 Alyshev ................. G06T 15/00
345/419
2013/0132380 A1* 5/2013 Polichroniadis ........ G06F 16/43
707/723
(Continued)

FOREIGN PATENT DOCUMENTS

CN 104703043 A 6/2015
CN 107944397 A 4/2018
(Continued)

OTHER PUBLICATIONS

International Search Report and Written Opinion received for PCT Patent Application No. PCT/CN2023/130439, mailed on Feb. 7, 2024, 20 pages (12 pages of English Translation and 8 pages of Original Document).
(Continued)

*Primary Examiner* — Daniel Samwel (57) ABSTRACT

A video processing method includes acquiring effect selection information in response to an effect triggering instruction, determining at least one to-be-applied effect type corresponding to the effect selection information, determining a target effect type from the at least one to-be-applied effect type, and converting the target text and/or the to-be-processed image into a target effect image corresponding to the target effect type. As such, a corresponding stylistic effect type is determined based on an image, text, or a combination thereof; further, the text and the image are converted into the effect of a target effect image based on the corresponding stylistic effect type, improving the accuracy of determining the corresponding stylistic effect type and further improving the image quality and effect display effect of the target effect image.

18 Claims, 4 Drawing Sheets

(51) Int. Cl.
  *G06F 3/0487* (2013.01)
  *G06F 40/279* (2020.01)
  *G06T 11/60* (2006.01)
  *G06T 13/00* (2011.01)
  *G06V 10/764* (2022.01)

(52) U.S. Cl.
  CPC ............ *G06F 40/279* (2020.01); *G06T 11/60* (2013.01); *G06T 13/00* (2013.01); *G06V 10/764* (2022.01); *G06T 2200/24* (2013.01); *G06T 2210/32* (2013.01)

(58) Field of Classification Search
  CPC ..... G06T 11/60; G06T 13/00; G06T 2200/24; G06T 2210/32
  See application file for complete search history.

(56) References Cited

U.S. PATENT DOCUMENTS

| | | | | |
|---|---|---|---|---|
| 2015/0117777 | A1* | 4/2015 | Hsun | G06T 7/50 382/173 |
| 2016/0035074 | A1* | 2/2016 | Jeong | G06T 11/60 382/282 |
| 2016/0286139 | A1* | 9/2016 | Tsuchiya | G06F 3/04845 |
| 2017/0019613 | A1* | 1/2017 | Ebihara | H04N 23/6811 |
| 2019/0238759 | A1* | 8/2019 | Ahn | G06T 5/20 |
| 2021/0097691 | A1* | 4/2021 | Liu | G06V 10/764 |
| 2022/0201203 | A1* | 6/2022 | Lim | H04N 1/215 |
| 2024/0314426 | A1* | 9/2024 | Pak | H04N 23/633 |

FOREIGN PATENT DOCUMENTS

| | | |
|---|---|---|
| CN | 110865754 A | 3/2020 |
| CN | 111541936 A | 8/2020 |
| CN | 111935505 A | 11/2020 |
| CN | 112040263 A | 12/2020 |
| CN | 112819685 A | 5/2021 |
| CN | 113254694 A | 8/2021 |
| CN | 114610677 A | 6/2022 |
| JP | 2011-119786 A | 6/2011 |

OTHER PUBLICATIONS

Office action received from Japanese patent application No. 2025-526577 mailed on Sep. 30, 2025, 8 pages (4 pages English Translation and 4 pages Original Copy).

Liu, et al., "Name Your Style: An Arbitrary Artist-aware Image Style Transfer", Arxiv.org, Cornell University Library, 201 Olin Library Cornell University Ithaca, NY 14853, IEEE Transactions on Pattern Analysis & Machine Intelligence, Feb. 28, 2022 (Feb. 28, 2022), XP091165781, pp. 1-15.

Supplementary European Search Report for EP Patent Application No. 23888042.1, Issued on Nov. 28, 2025, 10 pages.

\* cited by examiner

VIDEO PROCESSING METHOD AND APPARATUS, ELECTRONIC DEVICE, AND STORAGE MEDIUM

CROSS-REFERENCE TO RELATED APPLICATION(S)

This application claims priority to Chinese Patent Application No. 202211401216.X filed Nov. 9, 2022, the disclosure of which is incorporated herein by reference in its entirety.

TECHNICAL FIELD

Embodiments of the present disclosure relate to the field of video processing technology and, in particular, to a video processing method and apparatus, an electronic device, and a storage medium.

BACKGROUND

With the development of network technology, more and more applications have entered the lives of users, in particular, a series of software that can take short videos, which are popular with users.

In related art, a software developer may add various effect props to an application for a user to use in shooting a video. However, in the related art, the effect props currently provided for the user are limited, the quality of the video and the content richness of the video need to be further improved, and particularly, when stylistic effect processing is performed on an image or editing is performed on the image, display effect of an effect image generated based on related effect props is not good.

SUMMARY

The present disclosure provides a video processing method and apparatus, an electronic device, and a storage medium to determine a corresponding stylistic effect type based on an image, text, or a combination thereof and further convert the text and the image into the effect of a target effect image based on the corresponding stylistic effect type, improving the accuracy of determining the corresponding stylistic effect type and further improving the image quality and effect display effect of the target effect image.

In a first aspect, embodiments of the present disclosure provide a video processing method. The method includes the steps below.

Effect selection information is acquired in response to an effect triggering instruction. The effect selection information includes at least one of target text, an image input feature, or a to-be-processed image.

At least one to-be-applied effect type corresponding to the Effect selection information is acquired.

A target effect type is determined from the at least one to-be-applied effect type.

The target text and/or the to-be-processed image are converted into a target effect image corresponding to the target effect type.

In a second aspect, embodiments of the present disclosure further provide a video processing apparatus. The apparatus includes an effect triggering instruction response module, a to-be-applied effect type determination module, a target effect type determination module, and a target effect image determination module.

The effect triggering instruction response module is configured to acquire effect selection information in response to an effect triggering instruction. The effect selection information includes at least one of target text, an image input feature, or a to-be-processed image.

The to-be-applied effect type determination module is configured to determine at least one to-be-applied effect type corresponding to the effect selection information.

The target effect type determination module is configured to determine a target effect type from the at least one to-be-applied effect type.

The target effect image determination module is configured to convert the target text and/or the to-be-processed image into a target effect image corresponding to the target effect type.

In a third aspect, embodiments of the present disclosure provide an electronic device. The electronic device includes one or more processors and a storage apparatus configured to store one or more programs.

When executed by the one or more processors, the one or more programs cause the one or more processors to perform the video processing method according to any embodiment of the present disclosure.

In a fourth aspect, an embodiment of the present disclosure provides a storage medium including computer-executable instructions. The computer-executable instructions are executed by a computer processor to perform the video processing method according to any embodiment of the present disclosure.

According to the embodiments of the present disclosure, Effect selection information is acquired in response to an effect triggering instruction, at least one to-be-applied effect type corresponding to the Effect selection information is acquired, a target effect type is determined from the at least one to-be-applied effect type, and the target text and/or the to-be-processed image are converted into a target effect image corresponding to the target effect type. As such, a corresponding stylistic effect type is determined based on the image, the text, or a combination thereof. Further, the text and the image are converted into the effect of the target effect image based on the corresponding stylistic effect type, improving the accuracy of determining the corresponding stylistic effect type, further improving the image quality and effect display effect of the target effect image, improving the interactivity when a user uses an effect prop, and further improving user experience.

BRIEF DESCRIPTION OF DRAWINGS

The above and other features, advantages, and aspects of embodiments of the present disclosure will become more apparent with reference to the specific implementations hereinafter in conjunction with drawings. The same or similar reference numerals throughout the drawings denote the same or similar elements. It is to be understood that the drawings are illustrative and that originals and elements are not necessarily drawn to scale.

DETAILED DESCRIPTION

Embodiments of the present disclosure are described in more detail hereinafter with reference to the drawings.

It is to be understood that the various steps described in the method embodiments of the present disclosure may be performed in a different order, and/or in parallel. Additionally, the method embodiments may be performed with additional steps and/or may be performed with the shown steps omitted.

The term "includes" or its variant used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

It is to be noted that concepts such as "first" and "second" used herein are intended to distinguish between apparatuses, units/modules and are not to limit the order of or dependency between functions performed by the apparatuses, or modules.

It is to be noted that "one" or "multiple" in the present disclosure is illustrative and non-limiting and that those skilled in the art should understand that "one" or "multiple" is interpreted as "one or more" unless otherwise specified in the context.

The names of messages or information exchanged between apparatuses in embodiments of the present disclosure are illustrative and not to limit the scope of the messages or information.

It is to be understood that before using technical solutions disclosed in various embodiments of the present disclosure, a user should be notified of the type, scope of use, use scene and the like of personal information involved in the present disclosure and authorization from the user should be acquired in an appropriate manner according to relevant laws and regulations.

For example, in response to receiving an active request from a user, prompt information is sent to the user to explicitly remind the user that the requested operation requires acquisition and use of personal information of the user. Accordingly, the user can autonomously choose, according to the prompt information, whether to provide personal information for software or hardware, such as an electronic device, an application program, a server, or a storage medium, for executing operations of solutions of the present disclosure.

In an alternative but non-limiting implementation, in response to receiving the active request from the user, the manner in which the prompt information is sent to the user may be, for example, in the form of a pop-up window in which the prompt information may be presented in text. Additionally, the pop-up window may also carry a selection control for the user to select "agree" or "disagree" to determine whether to provide personal information for the electronic device.

It is to be understood that the preceding process of notifying the user and getting authorization from the user is illustrative and does not limit embodiments of the present disclosure and that other manners complying with relevant laws and regulations may also be applied to embodiments of the present disclosure.

It is to be understood that data (including, but not limited to, the data itself and acquisition or use of the data) involved in the solutions should comply with corresponding laws and regulations and relevant provisions.

Before the solutions are described, the application scenes are described illustratively. Technical solutions of the present disclosure may be applied to any scene in which an effect video needs to be generated. In an example, when the user uploads a pre-collected image to a server corresponding to application software, or when an image is collected in real time through a mobile terminal including a camera apparatus and the target text input by the user is acquired based on a display interface of the terminal device, a target effect image may be determined in three implementation manners based on the technical solutions of the present disclosure. In the first implementation manner, it may include that: when only the target text is acquired, at least one to-be-applied effect type may be determined according to a keyword in the target text; further, a target effect type is determined from the at least one to-be-applied effect type based on user needs or a system selection; further, the target text is converted into an association image associated with the target text; accordingly, fusion processing is performed on the association image and a target image corresponding to the target effect type to obtain the target effect image. In the second implementation manner, it may include that: when only a to-be-processed image is acquired, the at least one to-be-applied effect type may be determined according to the image content type in the to-be-processed image; further, the target effect type is determined from the at least one to-be-applied effect type based on user needs or a system selection; further, fusion processing is performed on the to-be-processed image and the target image corresponding to the target effect type to obtain the target effect image. In the third implementation manner, it may include that: when both the target text and the to-be-processed image are acquired, the at least one to-be-applied effect type may be determined by combining the target text and the to-be-processed image; further, the target effect type is determined from the at least one to-be-applied effect type based on user needs or a system selection; further, fusion processing is performed on the association image, the to-be-processed image, and the target image corresponding to the target effect type to obtain the target effect image. Accordingly, a corresponding stylistic effect type is determined based on the image, the text, or a combination thereof. Further, the text and the image are converted into the effect of the target effect image based on the stylistic effect type, improving the accuracy of determining the corresponding stylistic effect type and further improving the image quality and effect display effect of the target effect image.

Figure 1:
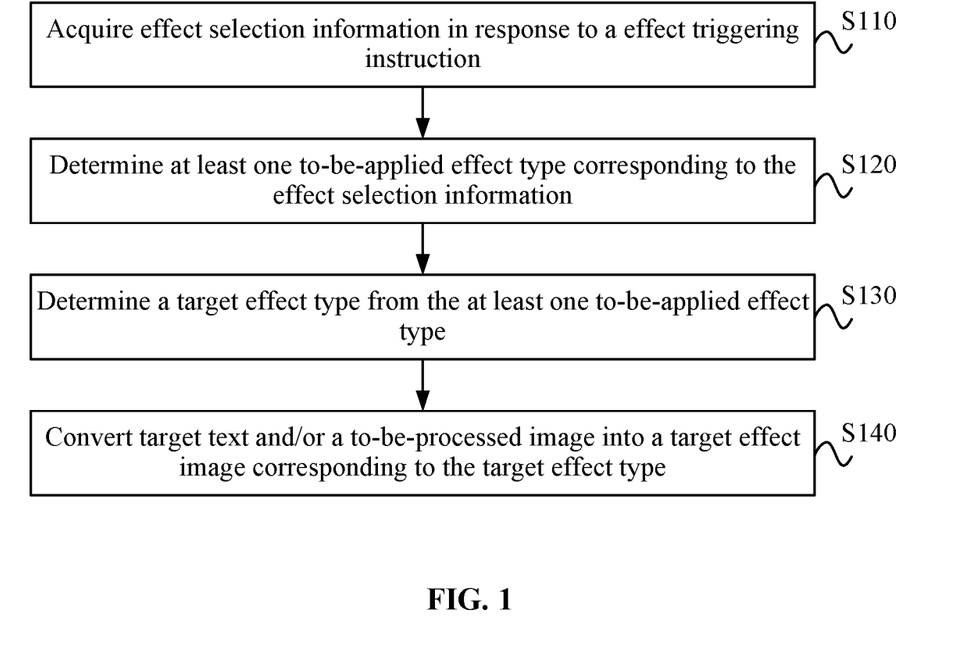
FIG. 1 is a flowchart of a video processing method according to an embodiment of the present disclosure.

FIG. 1 is a flowchart of a video processing method according to an embodiment of the present disclosure. This embodiment of the present disclosure is applicable to the case where a target effect type is determined based on target text and/or a to-be-processed image and the target text and/or the to-be-processed image are further converted into a target effect image corresponding to the target effect type. The method may be performed by a video processing apparatus. The video processing apparatus may be implemented in the form of software and/or hardware. In an embodiment, the apparatus is implemented by an electronic device. The electronic device may be, for example, a mobile terminal, a PC terminal, or a server. The technical solution according to this embodiment of the present disclosure may be executed based on a client, a server, or the cooperation between a client and a server.

As shown in FIG. 1, the method includes operations in the steps S110-S140 as below.

In S110, Effect selection information is acquired in response to an effect triggering instruction.

The video processing apparatus for performing a method for generating an effect video according to this embodiment of the present disclosure may be integrated in application software supporting an effect video processing function. Moreover, the software may be installed in an electronic device. In an embodiment, the electronic device may be, for example, a mobile terminal or a PC terminal. The application software may be image or video processing software. Examples of the software are not enumerated herein as long as the software can implement image or video processing. The application software may also be a specially-developed application program for the implementation of adding an effect and presenting the effect or may be integrated into a corresponding page. A user implements the processing of the effect video through the integrated page in the PC terminal.

In this embodiment, in the application software or application program supporting the effect video processing function, a control for triggering the effect may be pre-developed. When it is detected that the user triggers the control, the control responds to the effect triggering instruction so that the Effect selection information is acquired.

The effect selection information includes at least one of target text, an image input feature, or a to-be-processed image.

The target text may be the text that matches user needs. The image input feature may be a feature determined after a feature analysis is performed on a collected image. The to-be-processed image may be an image which needs to be processed. The image may be an image captured based on a terminal device or an image pre-stored in storage space by the application software. The terminal device may refer to an electronic product having an image shooting function, for example, a camera, a smartphone, and a tablet computer.

In an embodiment, determining the effect selection information includes determining the image input feature. The determining the image input feature includes determining the image input feature the image input feature based on that an invoked camera is a front camera or a rear camera.

Generally, when the user triggers an image shooting control, the terminal device may call the front camera or the rear camera to perform image collection based on a preset shooting parameter or a shooting parameter which was set for the last utilization of the application software. It is to be noted that an image input feature corresponding to an image captured by the front camera is different from an image input feature corresponding to an image captured by the rear-facing camera. In an example, images collected by the front-facing camera are mostly face images of the user, and image input features corresponding to these images may be facial features of the user; images collected by the rear-facing camera are mostly whole-body or half-body images of the user, and for image input features corresponding to these images, body features may be added on the basis of facial features.

In a practical application process, when it is detected that the user triggers an effect instruction, it may be determined first that the called camera is the front-facing camera or the rear-facing camera. Further, the corresponding image input feature is determined based on an image feature parameter corresponding to the front-facing camera or the rear-facing camera. As such, the intelligence of an effect prop in enhanced, the accuracy of determining a corresponding effect type is improved, and user experience is improved.

In a practical application, in general, the effect selection information can be determined only when certain effect instructions are triggered. In this case, the effect instructions may include at least one of the following: that an effect prop is triggered; that effect wakeup statement are triggered by audio information; or that a current body movement is consistent with a preset body movement.

In this embodiment, a control for triggering the effect prop may be preset. When the user triggers the control, an effect prop display page may be popped up in a display interface. Multiple effect props may be displayed on the display page. The user may trigger the corresponding effect prop. When it is detected that the user triggers the effect prop corresponding to the to-be-processed image, it indicates that the effect instruction is triggered. In another implementation, the audio information of the user may be pre-collected. Moreover, the collected audio information is analyzed and processed to identify the text corresponding to the audio information. The text corresponding to the audio information may include the preset wakeup statement. In an embodiment, the wakeup statement may be, for example, "Please shoot the current image" or "Please enable the effect function". In this case, it indicates that the to-be-processed image in the display interface may be acquired. In another implementation, some body movements may be preset as effect triggering movements. When it is detected that the body movement currently performed by the user in the sentence-piece of view is consistent with a preset body movement, it is determined that the effect instruction may be triggered. In an embodiment, the preset body movement may be, for example, raising one's hand, opening one's mouth, or turning one's head.

In the practical application process, the to-be-processed image is acquired based on an arbitrary selection in an image display page of the terminal device. Moreover, when a trigger of confirming the control or selecting the control is detected, it is determined that the effect instruction is triggered; and an image selected at the current moment is taken as the to-be-processed image. In another embodiment, multiple images are pre-stored at an early development stage. When it is detected that the user triggers the effect instruction, the pre-stored images can be directly loaded from the storage space into the current client. In another embodiment, when it is detected that the user triggers the effect instruction, an image, which is uploaded by the user through an external device to the current client in real time or periodically, is taken as the to-be-processed image.

In the practical application process, corresponding text may be input based on an editing box displayed in the display interface of the terminal device. The text input in the editing box may be taken as the target text. In another embodiment, a voice collection control may be pre-developed. When a trigger instruction on the voice collection control performed by the user is detected, the audio information of the user is collected and the collected audio information is analyzed and processed, to identify the text corresponding to the audio information. The identified text may be taken as the target text.

It is to be noted that when the effect triggering instruction is detected, when the input of the target text is not detected, only the to-be-processed image may be acquired. Moreover, the conversion of a target effect image is implemented subsequently only based on the to-be-processed image. Correspondingly, when the acquisition of the to-be-processed image is not detected, only the target text may be acquired to determine the target effect image based on the target text. When both the input of the target text and the collection of the to-be-processed image are detected, the to-be-processed image may be determined based on both the target text and the to-be-processed image. This is not specifically limited in this embodiment of the present disclosure.

In S120, at least one to-be-applied effect type corresponding to the Effect selection information is acquired.

In this embodiment, the to-be-applied effect type may be an effect type for performing stylized effect processing for an image. In an embodiment, the at least one to-be-applied effect type may include, but is not limited to, a type of cyberpunk, a type of Picasso style, a type of Van Gogh style, a type of ink wash painting, or a type of geometric painting.

In the practical application, after the Effect selection information is acquired, the at least one to-be-applied effect type corresponding to the Effect selection information is acquired.

In the practical application process, a to-be-applied effect type corresponding to the target text is determined in a manner different from that a to-be-applied effect type corresponding to the to-be-processed image is acquired. Accordingly, a to-be-applied effect type corresponding to the target text and a to-be-applied effect type corresponding to the to-be-processed image may be determined separately in a corresponding manner.

In an embodiment, determining at least one effect type corresponding to the target text may include that: at least one key sentence-piece is preset; a mapping relationship between each key sentence-piece and each corresponding to-be-applied effect type is established; after the target text is acquired, each sentence-piece included in the target text may be traversed based on each key sentence-piece to determine at least one target key sentence-piece corresponding to the target text; and the at least one to-be-applied effect type corresponding to the target text is determined based on the mapping relationship between each target key sentence-piece and each corresponding to-be-applied effect type.

In an embodiment, the determining at least one to-be-applied effect type corresponding to the to-be-processed image may include that: image content type parsing is performed on the to-be-processed image based on a preset algorithm to obtain a text description corresponding to the to-be-processed image; image content type corresponding to the to-be-processed image is acquired based on the text description to determine, based on the image content type, a scene included in the to-be-processed image; and the at least one to-be-applied effect type corresponding to the to-be-processed image is acquired based on a mapping relationship between each pre-established scene and each to-be-applied effect type.

It is to be noted that the at least one to-be-applied effect type corresponding to the target text may be different from or the same as the at least one to-be-applied effect type corresponding to the to-be-processed image.

It is to be noted that one or more to-be-applied effect types corresponding to the target text may exist. When one to-be-applied effect type exists, an effect image may be processed based on this effect type. When a plurality of to-be-applied effect types exist, a selection may be made from the to-be-applied effect types to process the effect image based on a selected to-be-applied effect type.

It is to be noted that in order to enable the user to know the type name of each to-be-applied effect type and visually see the effect display effect corresponding to each to-be-applied effect type, after the at least one to-be-applied effect type is determined, the method further includes that: an effect cover and text description that correspond to each to-be-applied effect type are displayed.

In this embodiment, an effect cover may be an image for representing the effect display effect of a corresponding to-be-applied effect type. It is to be noted that an image mostly similar to the style characteristic of a to-be-selected effect type may be pre-taken as an effect cover of the corresponding to-be-selected effect type and stored in the storage space correspondingly. In this case, when the at least one to-be-applied effect type is determined from each to-be-selected effect type, the effect cover corresponding to each to-be-applied effect type may be called separately and displayed. In an embodiment, the text description may include, for example, an effect name, an effect type, and an effect introduction.

In the practical application, after the at least one to-be-applied effect type is determined, the effect cover corresponding to each to-be-applied effect type may be called and the text description corresponding to each to-be-applied effect type is determined. Further, each effect cover and corresponding text description are displayed according to a preset arrangement rule.

It is to be noted that the preset arrangement rule may be a preset effect type arrangement rule. In an embodiment, the preset arrangement rule may include a default arrangement rule determined or preset randomly, or determined or preset according to the historical data of the user. In an example, the preset arrangement rule may include, for example, a list layout, a tiled layout, and a ring layout.

In S130, a target effect type is determined from the at least one to-be-applied effect type.

In this embodiment, after the at least one to-be-applied effect type is determined, each to-be-applied effect type is screened to obtain the target effect type. The target effect type may be an effect type that is finally applied. In an example, the target effect type may be the type of cyberpunk. In this case, the finally obtained effect image may be similar to an image style of cyberpunk.

In the practical application, the target effect type is determined from the at least one to-be-applied effect type in two manners. In one of the two manners, the target effect type may be determined based on a trigger instruction on the at least one to-be-applied effect type.

In a specific implementation, after the at least one to-be-applied effect type is obtained, each to-be-applied effect type may be displayed in the display interface so that the user can make a selection from the at least one to-be-applied effect types through the trigger instruction. When it is detected that the user performs the trigger instruction on the at least one to-be-applied effect type and sends a confirmation instruction based on the confirmation control, the at least one currently-selected to-be-applied effect type may be taken as the at least one target effect type.

It is to be noted that when it is detected that the user triggers any to-be-applied effect type, an effect cover corresponding to the to-be-applied effect type may be expanded according to a preset proportion to distinguish the to-be-applied effect type from other to-be-applied effect types that are not triggered.

In the other one of the two manners, when the trigger instruction on the at least one to-be-applied effect type is not detected within a preset duration, the target effect type may be selected from the at least one to-be-applied effect type according to a preset rule.

In this embodiment, the preset duration may be a preset selection duration. The preset duration may be any value. In an embodiment, the preset duration may be five seconds. The preset rule may be a preset rule for effect type selection. The preset rule includes that, a default effect type may be determined or preset randomly, or the default effect type may be determined or preset according to the historical data of a target user. The preset default effect type may be any effect type. In an embodiment, the preset default effect type may be an effect type of cyberpunk.

In the specific implementation, after the at least one to-be-applied effect type is obtained, each to-be-applied effect type is supplied to the user, and an effect type selection countdown may also be displayed in the display interface. The countdown time is the preset selection duration. It is to be understood that the user may make a selection from a plurality of to-be-applied effect types through the trigger instruction. When a selection duration reaches the preset duration, that is, when the effect type selection countdown returns to zero, if no trigger instruction on each to-be-applied effect type is detected in this duration, the target effect type may be selected from the at least one to-be-applied effect type according to the preset rule.

It is to be noted that the determination of the target effect type based on the two preceding manners has advantages of improving the interaction experience when the user uses an effect prop, meeting the personalized needs of the user, and improving the intelligence of the effect prop.

It is to be noted that the target effect type determined based on the preset rule may be changed by customizing a default selection parameter in the effect prop.

It is to be further noted that in order to improve the effect processing effect of the effect prop and reflect a smooth transition of an effect processing process, after the target effect type is determined, the method further includes playing a transition animation before displaying the target effect image.

In this embodiment, the transition animation may be a preset animation for representing a transition and conversion between scenes. In an example, the transition animation may include, for example, a fade or a cut. In the practical application, multiple transition animations may be pre-developed in an early development stage. The user may set a parameter regarding a transition animation in the effect prop to determine the transition animation played in the effect processing process so that the corresponding transition animation can be played after the target effect type is determined. Accordingly, the target effect image is displayed based on the transition animation.

It is to be noted that in the effect processing process, in order to enable the user to know the effect processing process timely, in a process of playing the transition animation, the method further includes that a progress bar for producing the target effect image is displayed in a target display position corresponding to the transition animation.

In this embodiment, the progress bar may be an image for representing a production completion percentage of the target effect image. The progress bar may be of any shape. In an embodiment, the progress bar may be, for example, elongated, annular, nodal, or of a shape matching the target effect type. It is to be noted that the style of the progress bar may also be set in a configuration parameter of the effect prop based on user's needs to meet the personalized needs of the user.

In the specific implementation, in the process of playing the transition animation, the progress bar for representing the completion of the target effect image may be displayed in the target display position corresponding to the transition animation. Such an arrangement has advantages of enabling the user to have a certain perception of the processing progress of the target effect image and the time possibly needed, avoiding the case where the application program has no response and the user has no perception, improving the interactivity between the user and the interface, and improving user experience.

In S140, the target text and/or the to-be-processed image are converted into the target effect image corresponding to the target effect type.

In this embodiment, after the target effect type is determined, the target text and/or the to-be-processed image are converted into the target effect image corresponding to the target effect type. The target effect image is an effect image displayed in the display interface after being processed by the effect prop.

It is to be understood that if the target text is acquired when the effect instruction is triggered, the target effect image may be determined based on the target text and the target effect type. If the to-be-processed image is acquired when the effect instruction is triggered, the target effect image may be determined based on the to-be-processed image and the target effect type. If the target text and the to-be-processed image are acquired when the effect instruction is triggered, the target effect image may be determined based on the target text, the to-be-processed image, and the target effect type.

In an embodiment, converting the target text and/or the to-be-processed image into the target effect image corresponding to the target effect type includes that: a target image associated with the target effect type is determined; and fusion processing is performed on the target image and an association image associated with the target text and/or the to-be-processed image to obtain the target effect image.

In this embodiment, the target image may be a pre-stored effect image material. In an example, when the target effect type is the type of ink wash painting, the associated target image is an image associated with the type of ink wash painting, that is, an image drawn in the form of ink wash painting. In the practical application process, after a plurality of to-be-applied effect types are determined, a corresponding type identifier is set for each to-be-applied effect type. Moreover, at least one to-be-applied image corresponding to each to-be-applied effect type is determined. An association relationship between a type identifier and a corresponding to-be-applied image is established. Further, each to-be-applied image is stored in an image material library so that the corresponding target image is called from the image material library based on an identifier corresponding to the target effect type when the target effect type is determined.

In this embodiment, the association image associated with the target text may be an image determined based on a keyword included in the target text. In an example, when the target text is that "baby, a beautiful illustration concept art anime key visual trending pixiv fanbox by makoto shinkai and studio ghibli, visually stunning", the association image associated with the target text is an image including a baby.

In this embodiment, the fusion processing may be performed for the association image, the to-be-processed image, and the target image based on a preset image processing algorithm to obtain the target effect display image. The image processing algorithm may be a lookup table (LUT) for color. It is to be understood by those skilled in the art that the principle of the LUT is to look up a mapped color through a respective color. It can be understood as a function LUT (R1, G1, B1) with three independent variables R, G, and B, with the output being the correspondingly mapped values R2, G2, and B2. Accordingly, the effect of changing the exposure and color of an image is achieved.

In the specific implementation, after the target effect type is determined, the associated target image may be called based on the target effect type. Further, if only the target text exists, the fusion processing may be performed for the association image associated with the target text and the target image to convert the association image into the target effect image having a similar style to the target image. If only the to-be-processed image exists, the fusion processing may be performed for the to-be-processed image and the target image to convert the to-be-processed image into the target effect image having a similar style to the target image. If both the target text and the to-be-processed image exist, the fusion processing may be performed for the association image associated with the target text, the to-be-processed image, and the target image to obtain the target effect image having a similar style to the target image. Such an arrangement has advantages of improving the effect display effect of the target effect image, meeting the personalized needs of the user, and improving user experience.

It is to be noted that when the target effect image is generated, the effect intensity may also be pre-adjusted so that the target effect image finally generated better meets user needs. In an example, when the effect intensity is set to "0", the target effect image has the highest similarity to the to-be-processed image and/or the association image, and the style characteristic of the target image is not reflected. When the effect intensity is set to "0.5", the target effect image has a moderate similarity to the to-be-processed image and/or the association image, and the style characteristic of the target image is reflected. When the effect intensity is set to "1", the target effect image has the lowest similarity to the to-be-processed image and/or the association image, and the style characteristic of the target image is fully reflected.

It is to be noted that in order to make the target effect image closer to the effect display effect corresponding to the target effect type, the effect image may be pre-processed based on a preset parameter before the target effect image is generated, finally obtaining the target effect image.

On this basis, before the target effect image is obtained, the method further includes determining a filter parameter corresponding to the target effect type to determine the target effect image based on the filter parameter.

In this embodiment, the filter parameter may be a custom parameter corresponding to the target effect type. In an embodiment, the filter parameter may include, but is not limited to, saturation, contrast, sharpness, highlight, shadow, and hue. It is to be noted that a corresponding filter parameter may be preset for each target effect type. In this case, when the target effect type is determined, the image to be processed is edited directly based on the corresponding filter parameter to obtain the target effect image. In an example, when the target effect type is the type of ink wash painting, saturation may be set to 0 as for the corresponding filter parameter. When the target effect type is the type of cyberpunk, as for the corresponding filter parameter, red-blue contrast may be enhanced and highlight may be added.

According to the technical solution in this embodiment of the present disclosure, Effect selection information is acquired in response to an effect triggering instruction, at least one to-be-applied effect type corresponding to the Effect selection information is acquired, a target effect type is determined from the at least one to-be-applied effect type, and the target text and/or the to-be-processed image are converted into a target effect image corresponding to the target effect type. As such, a corresponding stylistic effect type is determined based on the image, the text, or a combination thereof. Further, the text and the image are converted into the effect of the target effect image based on the stylistic effect type, improving the accuracy of determining the corresponding stylistic effect type, further improving the image quality and effect display effect of the target effect image, improving the interactivity when the user uses an effect prop, and further improving user experience.

Figure 2:
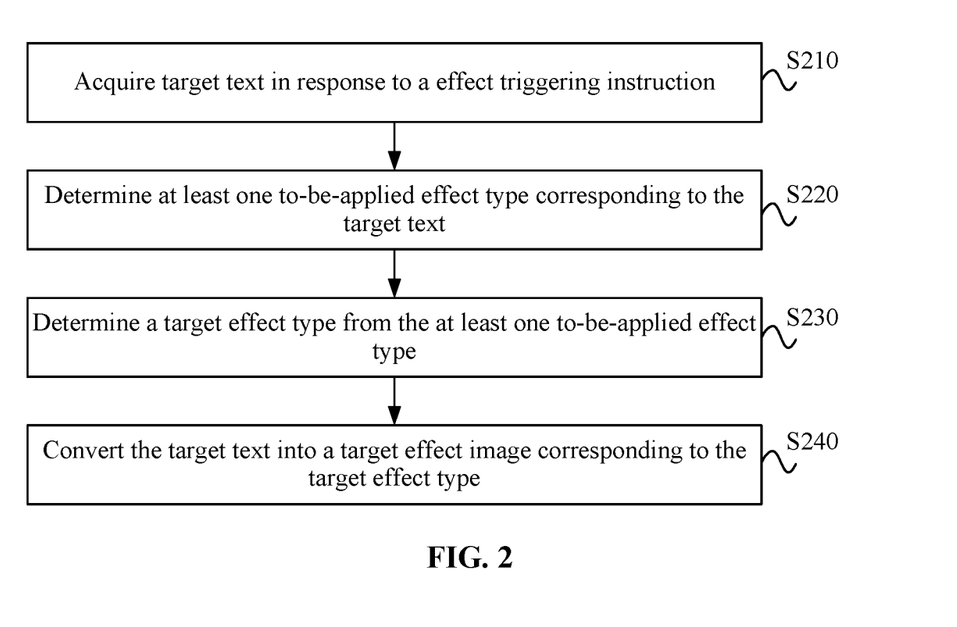
FIG. 2 is a flowchart of a video processing method according to an embodiment of the present disclosure.

FIG. 2 is a flowchart of a video processing method according to an embodiment of the present disclosure. On the basis of the preceding embodiment, when only target text is acquired in response to an effect triggering instruction, a target effect type is determined based on the target text. Moreover, the target text is converted into a target effect image corresponding to the target effect type. For the specific implementation, refer to the technical solution in this embodiment. Terms identical to or similar to the preceding embodiment are not repeated herein.

As shown in FIG. 2, the method includes operations in the steps S210-S240 as below.

In S210, target text is acquired in response to an effect triggering instruction.

In a practical application, when it is detected that a user performs a trigger instruction on an effect control, a to-be-processed image and the target text may be acquired so that application software can process the to-be-processed image based on the information included in the target text.

In an embodiment, acquiring effect selection information includes acquiring the target text. Acquiring the target text includes that a text input box is displayed to input the target text.

In this embodiment, the target region may be any region in the display interface. The text input box may be a window for supporting text input. The text input box may be used for receiving the input and editing of text by the user. In addition, functions including deleting text, moving a text insertion position, and selecting text may be implemented.

In the practical application, a text editing control may be pre-developed. When it is detected that the user performs a trigger instruction on the text editing control, the text input box may be displayed in the target region of the display interface so that the user can input or edit the target text in the text input box. In another embodiment, when it is detected that the user triggers an effect instruction, the text input box may be directly displayed in the target region of the display interface so that the user can edit the target text in the editing box, improving the interactivity between the user and the display interface, meeting the personalized needs of the user, and improving user experience.

In S220, at least one to-be-applied effect type corresponding to the target text is determined.

In this embodiment, after the target text is acquired, the at least one to-be-applied effect type corresponding to the target text is determined. A to-be-applied effect type may be an effect type matching each sentence-piece included in the target text.

In an embodiment, determining the at least one to-be-applied effect type corresponding to the target text includes that: word segmentation is performed on the target text to determine at least one keyword corresponding to the target text; and the at least one to-be-applied effect type is determined from a plurality of to-be-selected effect types based on the at least one keyword.

In this embodiment, the word segmentation may be performed on the target text based on a preset word segmentation algorithm. The preset word segmentation algorithm may be any algorithm that can implement word segmentation. In an embodiment, the preset word segmentation algorithm may be a natural language processing algorithm.

In this embodiment, a keyword may be a preset word that can be identified by the application software. In an embodiment, the at least one keyword corresponding to the target text includes at least one of an object type, a scene, a style type, or an environment. The object type may be an object type that is included in the target text and requires effect processing. In an embodiment, the object type may include, for example, characters, pets, cartoon characters, food, flowers and plants, and buildings. In an embodiment, the scene may include, but is not limited to, an indoor scene, a night scene, a street scene, and a sunset scene. The style type may be any stylistic image type input by the user. In an embodiment, the style type may include, but is not limited to, a type of oil painting, a type of ink wash painting, a cartoon type, and a type of line painting. The environment may include, but is not limited to, a mountain, a lake, a sea, and the sky. In an example, when the target text is "A beautiful painting by vincent van gogh, Post Impressionism, oil on canvas, trending on art station, starry night", a corresponding keyword includes a style type of "Post Impressionism, oil on canvas". In this embodiment, multiple keywords may be preset. Moreover, an effect type corresponding to each keyword may be generated separately. These effect types may be taken as the to-be-selected effect types. Further, an association relationship between each keyword and a corresponding to-be-selected effect type is established, and each to-be-selected effect type is stored in a preset storage space.

In the practical application, after the target text is acquired, the word segmentation may be performed for the target text based on the preset word segmentation algorithm to obtain at least one sentence-piece. Each sentence-piece is traversed based on a preset keyword to determine the at least one keyword corresponding to the target text. Further, the at least one to-be-applied effect type corresponding to the target text may be determined from the to-be-selected effect types based on the association relationship between each keyword and a corresponding to-be-selected effect type, improving the screening accuracy of the at least one to-be-applied effect type, meeting the personalized needs of the user, and improving the intelligence of an effect prop.

It is to be noted that one or more to-be-applied effect types may exist. In the case of one to-be-applied effect type, the effect type may be taken as a target effect type to perform processing based on the target effect type. In the case of multiple to-be-applied effect types, a selection may be made from the to-be-applied effect types based on user needs to determine the target effect type.

It is to be further noted that in the case of multiple to-be-applied effect types, the target text may be edited again. A keyword is added or deleted on the original basis so that the obtained to-be-applied effect types better meet user needs.

In S230, the target effect type is determined from the at least one to-be-applied effect type.

In S240, the target text is converted into a target effect image corresponding to the target effect type.

In the practical application, after the target effect type is obtained, a target image corresponding to the target effect type may be determined. Moreover, an association image associated with the target text is determined. Further, fusion processing is performed on the association image and the target image to obtain the target effect image corresponding to the target effect type.

According to the technical solution in this embodiment of the present disclosure, target text is acquired in response to an effect triggering instruction, at least one to-be-applied effect type corresponding to the target text is determined, a target effect type is determined from the at least one to-be-applied effect type, and the target text is converted into a target effect image corresponding to the target effect type. As such, a corresponding stylistic effect type is determined based on a keyword in the text. Further, the text is converted into the effect of the corresponding target effect image, meeting the personalized needs of the user, improving the interactivity when the user uses an effect prop, and improving user experience.

Figure 3:
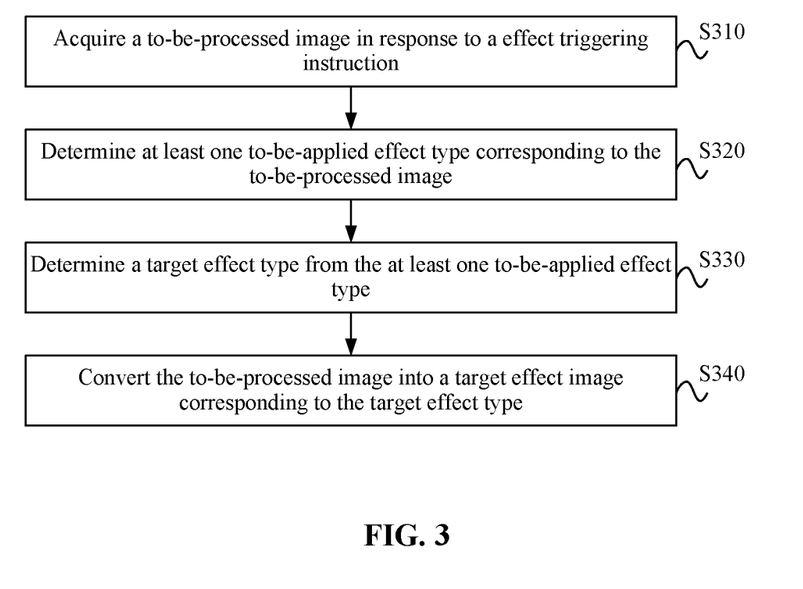
FIG. 3 is a flowchart of a video processing method according to an embodiment of the present disclosure.

FIG. 3 is a flowchart of a video processing method according to an embodiment of the present disclosure. On the basis of the preceding embodiments, when only a to-be-processed image is acquired in response to an effect triggering instruction, a target effect type is determined based on the to-be-processed image. Moreover, the to-be-processed image is converted into a target effect image corresponding to the target effect type. For the specific implementation, refer to the technical solution in this embodiment. Terms identical to or similar to the preceding embodiments are not repeated herein.

As shown in FIG. 3, the method includes operations in the steps S310-S340 as below.

In S310, a to-be-processed image is acquired in response to an effect triggering instruction.

In this embodiment, the to-be-processed image is acquired in at least two manners. In one of the at least two manners, a selection based on several images pre-stored in a storage space may be performed to obtain the to-be-processed image. In an embodiment, an image upload button is displayed in a display interface. When a trigger instruction on the image upload button is detected, a target image library is displayed, and the to-be-processed image is acquired from the target image library.

In this embodiment, the image upload button may be a control that is preset in an early development stage and is used for performing an image upload function. It is to be noted that the image upload button may be set in any region in the display interface, which is not specifically limited in this embodiment of the present disclosure. The target image library may be a storage space for storing image materials. Images included in the target image library may include, for example, a system default image pre-stored by a developer or a custom image subsequently added by a user during an application process.

In a specific implementation, the image upload button may be preset and displayed in the display interface. When it is detected that the user triggers an effect instruction, the image upload button may be displayed in the display interface. When it is detected that the user performs a trigger instruction on the image upload button, a target image library display page may be popped up in the display interface. In another embodiment, the target image display page is jumped to from the display interface. The display interface may display multiple to-be-selected images. When it is detected that the user performs a trigger instruction on any to-be-selected image, the to-be-selected image may be taken as the to-be-processed image.

In an embodiment, in another implementation manner of the at least two manners, the to-be-processed image may be determined from at least one captured video frame when the trigger instruction on the image upload button is not detected within a preset duration.

In this embodiment, the preset duration may be a preset selection duration. The preset duration may be any value. In an embodiment, the preset duration may be three seconds.

In a practical application, when it is detected that the user triggers the effect instruction, a terminal device may enable a shooting function to acquire the to-be-processed image. Moreover, an image selection countdown is displayed in the display interface. The countdown time is the preset selection duration. It is to be understood that when the terminal device enables the shooting function, the image upload button is displayed in the display interface. When a waiting duration reaches the preset duration, that is, when the image selection countdown returns to zero, if no trigger instruction performed by the user on the image upload button is detected, the to-be-processed image may be determined based on the at least one video frame captured by the terminal device, enhancing the flexibility and diversity of manners of acquiring the to-be-processed image, improving the interactivity between the user and the display interface, and improving user experience.

It is to be noted that the to-be-processed image may be determined from the at least one captured video frame in at least two manners. In one implementation manner of the at least two manners, a video frame captured by the terminal device at an end moment of the countdown is taken as the to-be-processed image. In an embodiment, acquiring the to-be-processed image from the at least one captured video frame includes that the video frame captured at the end of the countdown is captured as the to-be-processed image.

In the practical application, when no trigger instruction performed by the user on the image upload button is detected within the preset duration, the countdown displayed in the display interface returns to zero. The video frame captured by the terminal device at the current moment is taken as the to-be-processed image.

In another implementation manner of the at least two manners, the to-be-processed image is acquired based on a trigger instruction on at least one video frame captured within the preset duration.

In the practical application, when no trigger instruction performed by the user on the image upload button is detected within the preset duration, a video shot within the preset duration by the terminal device may be processed based on a preset program to obtain the at least one video frame. Moreover, the at least one video frame is displayed in the display interface. The user may make a selection from multiple video frames through a trigger instruction. When a trigger instruction on one of the video frames is detected, the video frame currently selected by the user may be taken as the to-be-processed image, enhancing the diversity of manners of acquiring the to-be-processed image, improving the interactivity between the user and the display interface, meeting the personalized needs of the user, and improving user experience.

In S320, at least one to-be-applied effect type corresponding to the to-be-processed image is acquired.

In this embodiment, after the to-be-processed image is acquired, the at least one to-be-applied effect type corresponding to the to-be-processed image is acquired. A to-be-applied effect type may be an effect type matching the image content type in the to-be-processed image.

In a practical application process, a mapping relationship between the image content type and a to-be-selected effect type may be pre-established. That is, at least one to-be-selected effect type matching each image content type most is determined. In this case, after the to-be-processed image is obtained, the image content type thereof may be analyzed, determining the at least one to-be-applied effect type corresponding to the to-be-processed image. In an example, when the to-be-processed image is a landscape picture, a corresponding to-be-applied effect type may include, for example, a type of ink wash painting or a type of oil painting. When the to-be-processed image is a portrait, a corresponding to-be-applied effect type may include, for example, a type of manga, a type of oil painting, and a type of pixel style. When the to-be-processed image is an image including a pet, a corresponding to-be-applied effect type may be a type of abstract painting.

In an embodiment, determining the at least one to-be-applied effect type corresponding to the to-be-processed image includes determining the image content type of the to-be-processed image and determining the at least one to-be-applied effect type from at least one to-be-selected effect type according to the image content type and the pre-established mapping relationship.

In this embodiment, the image content type may be a description of an object, a scene, and an environment that are included in the to-be-processed image. In an embodiment, the image content type may include at least one of an object type, a scene, a style type, or an environment. The object type may be a type of an object included in the to-be-processed image. In an embodiment, the object type may include, for example, characters, pets, scenery, and buildings. It is to be noted that one or more objects may be included in the to-be-processed image. When one object is in the to-be-processed image, a to-be-applied effect type corresponding to this object type may be determined. When multiple objects are in the to-be-processed image and correspond to multiple object types, at least one to-be-applied effect type corresponding to each of the object types of these objects may be determined. In an embodiment, the scene may include, but is not limited to, an indoor scene, a night scene, a street scene, and a sunset scene. The style type may be a style type corresponding to the to-be-processed image. In an embodiment, the style type may include, but is not limited to, a type of oil painting, a type of ink wash painting, a cartoon type, and a type of line painting. The environment may include, but is not limited to, a mountain, a lake, a sea, and the sky.

In this embodiment, the mapping relationship may be a pre-established mapping relationship between the image content type and the to-be-selected effect type. The mapping relationship includes each image content type and at least one to-be-selected effect type corresponding to each image content type.

In the specific implementation, after the to-be-processed image is obtained, in order to match the at least one to-be-applied effect type corresponding to the to-be-processed image, image processing may be performed for the to-be-processed image based on a preset algorithm to determine the image content type corresponding to the to-be-processed image. Further, the image content type is analyzed. Moreover, the at least one to-be-applied effect type matching the image content type is determined from a plurality of to-be-selected effect types according to the pre-established mapping relationship, finally obtaining the at least one to-be-applied effect type corresponding to the to-be-processed image. Such an arrangement has advantages of improving the intelligence and personalized suitability of an effect prop, reducing the error rate of a target effect image, and improving user experience.

In S330, a target effect type is determined from the at least one to-be-applied effect type.

In S340, the to-be-processed image is converted into a target effect image corresponding to the target effect type.

In the practical application, after the target effect type is obtained, a target image corresponding to the target effect type may be determined. Further, fusion processing is performed on the to-be-processed image and the target image to obtain the target effect image corresponding to the target effect type.

According to the technical solution in this embodiment of the present disclosure, a to-be-processed image is acquired in response to an effect triggering instruction, at least one to-be-applied effect type corresponding to the to-be-processed image is acquired, a target effect type is determined from the at least one to-be-applied effect type, and the to-be-processed image is converted into a target effect image corresponding to the target effect type. As such, a corresponding stylistic effect type is determined based on image content type. Further, the image is converted into the effect of the corresponding target effect image, improving the intelligence of an effect prop and effectively improving the display effect of the target effect image.

Figure 4:
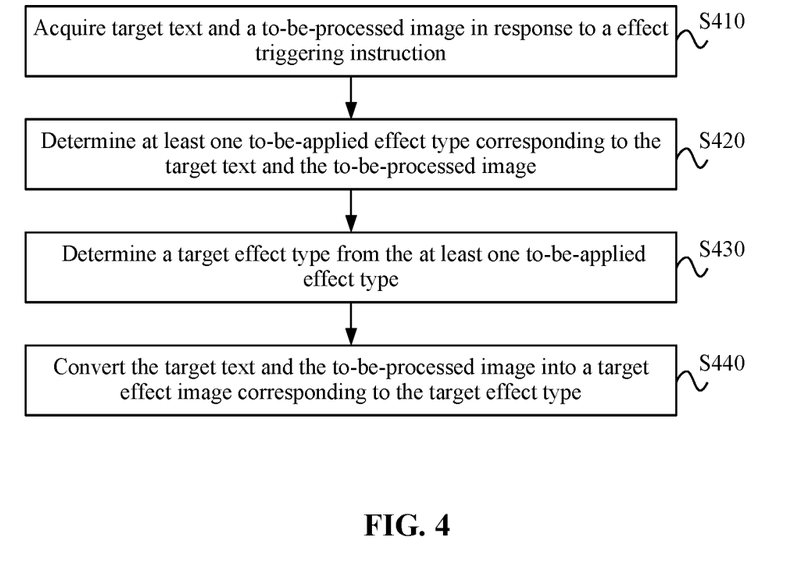
FIG. 4 is a flowchart of a video processing method according to an embodiment of the present disclosure.

FIG. 4 is a flowchart of a video processing method according to an embodiment of the present disclosure. On the basis of the preceding embodiments, when both target text and a to-be-processed image are acquired in response to an effect triggering instruction, a target effect type is determined based on the target text and the to-be-processed image. Moreover, the target text and the to-be-processed image are converted into a target effect image corresponding to the target effect type. For the specific implementation, refer to the technical solution in this embodiment. Terms identical to or similar to the preceding embodiments are not repeated herein.

As shown in FIG. 4, the method includes operations in the steps S410-S440 as below.

In S410, target text and a to-be-processed image are acquired in response to an effect triggering instruction.

It is to be noted that a manner of acquiring the target text and the to-be-processed image is the same as a manner described in the preceding embodiments, which is not specifically repeated in this step.

In S420, at least one to-be-applied effect type corresponding to the target text and the to-be-processed image is acquired.

In this embodiment, after the target text and the to-be-processed image are acquired, the at least one to-be-applied effect type corresponding to the target text and the to-be-processed image is acquired. In an embodiment, the at least one to-be-applied effect type may include at least one effect type corresponding to the target text and at least one effect type corresponding to the to-be-processed image. In another embodiment, the at least one to-be-applied effect type may include at least one effect type corresponding to both the target text and the to-be-processed image. This is not specifically limited in this embodiment of the present disclosure.

In a practical application, when both the target text and the to-be-processed image are acquired, in determining the at least one to-be-applied effect type, the at least effect type corresponding to the target text and the at least one effect type corresponding to the to-be-processed image may be determined first. Further, a union or an intersection is taken for these effect types, and the finally obtained set is taken as a set corresponding to the at least one to-be-applied effect type. An implementation manner of union processing and an implementation manner of intersection processing are described in detail hereinafter.

In an embodiment, for the union processing, in a corresponding implementation manner, a first effect type corresponding to the target text may be determined, a second effect type corresponding to the to-be-processed image may be determined, and a union including the first effect type and the second effect type may be determined to obtain the at least one to-be-applied effect type.

In this embodiment, the first effect type may be an effect type determined by analyzing a keyword included in the target text. The second effect type may be an effect type determined by analyzing the image content type in the to-be-processed image. It is to be noted that one or more first effect types and one or more second effect types may exist.

In a specific implementation, after the target text and the to-be-processed image are obtained, the first effect type corresponding to the target text may be determined based on the keyword included in the target text. Moreover, the second effect type corresponding to the to-be-processed image may be determined based on the image content type in the to-be-processed image. Further, the first effect type and the second effect type are combined to obtain the union including the first effect type and the second effect type. Moreover, the union is taken as the set corresponding to the at least one to-be-applied effect type to obtain the at least one to-be-applied effect type corresponding to the target text and the to-be-processed image.

In an embodiment, for the intersection processing, in a corresponding implementation manner, the first effect type corresponding to the target text may be determined, the second effect type corresponding to the to-be-processed image may be determined, and an intersection of the first effect type and the second effect type may be determined to obtain the at least one to-be-applied effect type.

In a practical application, after the first effect type corresponding to the target text and the second effect type corresponding to the to-be-processed image are obtained, the intersection may be taken for the first effect type and the second effect type. Specifically, at least one effect type in which the first effect type coincides with the second effect type is determined, and the corresponding intersection is constructed based on these effect types. Further, the intersection is taken as the set corresponding to the at least one to-be-applied effect type to obtain the at least one to-be-applied effect type corresponding to the target text and the to-be-processed image.

It is to be noted that the determination of the at least one to-be-applied effect type in the two preceding manners has advantages of enhancing the flexibility and diversity of manners of determining the at least one to-be-applied effect type, improving the intelligence of an effect prop, improving the richness and interest of a target effect image, and improving user experience.

In S430, a target effect type is determined from the at least one to-be-applied effect type.

In S440, the target text and the to-be-processed image are converted into a target effect image corresponding to the target effect type.

In the practical application, after the target effect type is obtained, a target image corresponding to the target effect type may be determined. Moreover, an association image associated with the target text is determined. Further, fusion processing is performed on the association image, the to-be-processed image, and the target image to obtain the target effect image corresponding to the target effect type.

According to the technical solution in this embodiment of the present disclosure, target text and a to-be-processed image are acquired in response to an effect triggering instruction, at least one to-be-applied effect type corresponding to the target text and/or the to-be-processed image is acquired, a target effect type is determined from the at least one to-be-applied effect type, and the target text and/or the to-be-processed image are converted into a target effect image corresponding to the target effect type. As such, a corresponding stylistic effect type is determined based on both the text and the image. Further, the text and the image are converted into the effect of the corresponding target effect image, improving the accuracy of determining the corresponding stylistic effect type, further improving the image quality and effect display effect of the target effect image, improving the interactivity when a user uses an effect prop, and further improving user experience.

Figure 5:
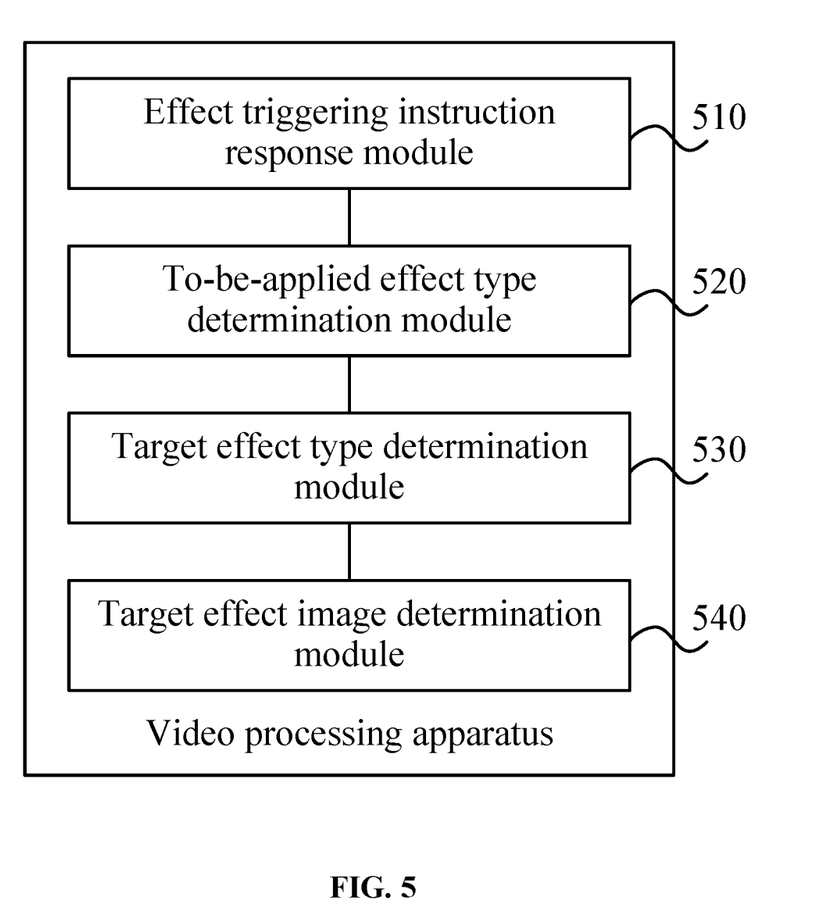
FIG. 5 is a structural diagram of a video processing apparatus according to an embodiment of the present disclosure.

FIG. 5 is a structural diagram of a video processing apparatus according to an embodiment of the present disclosure. As shown in FIG. 5, the apparatus includes an effect triggering instruction response module 510, a to-be-applied effect type determination module 520, a target effect type determination module 530, and a target effect image determination module S40.

The effect triggering instruction response module 510 is configured to acquire effect selection information in response to an effect triggering instruction. The effect selection information includes at least one of target text, an image input feature, or a to-be-processed image.

The to-be-applied effect type determination module 520 is configured to determine at least one to-be-applied effect type corresponding to the effect selection information.

The target effect type determination module 530 is configured to determine a target effect type from the at least one to-be-applied effect type.

The target effect image determination module S40 is configured to convert the target text and/or the to-be-processed image into a target effect image corresponding to the target effect type.

On the basis of the preceding technical solutions, the effect triggering instruction response module 510 includes a to-be-processed image acquisition submodule. The to-be-processed image acquisition submodule includes a control display unit, a to-be-processed image first determination unit, and a to-be-processed image second determination unit.

The control display unit is configured to display an image upload button in a display interface.

The to-be-processed image first determination unit is configured to, when a trigger instruction on the image upload button is detected, display a target image library to acquire the to-be-processed image from the target image library.

In another embodiment, the to-be-processed image second determination unit is configured to, when the trigger instruction on the image upload button is not detected within a preset duration, acquire the to-be-processed image from at least one captured video frame.

On the basis of the preceding technical solutions, the to-be-processed image second determination unit includes a to-be-processed image first determination sub-unit and a to-be-processed image second determination sub-unit.

The to-be-processed image first determination sub-unit is configured to capture a captured video frame at an end of a countdown as the to-be-processed image.

In another embodiment, the to-be-processed image second determination sub-unit is configured to acquire the to-be-processed image based on a trigger instruction on at least one video frame captured within the preset duration.

On the basis of the preceding technical solutions, the effect triggering instruction response module 510 includes a target text acquisition submodule.

The target text acquisition submodule is configured to display a text input box to input the target text.

On the basis of the preceding technical solutions, the effect triggering instruction response module 510 includes an image input feature determination submodule.

The image input feature determination submodule is configured to determine the image input feature based on that an invoked camera is a front camera or a rear camera.

On the basis of the preceding technical solutions, the effect selection information includes the target text. The to-be-applied effect type determination module 520 includes a target text processing unit and a first to-be-applied effect type determination unit.

The target text processing unit is configured to perform word segmentation on the target text to determine at least one keyword corresponding to the target text.

The to-be-applied effect type first determination unit is configured to determine the at least one to-be-applied effect type from a plurality of to-be-selected effect types based on the at least one keyword.

On the basis of the preceding technical solutions, the effect selection information includes the to-be-processed image. The to-be-applied effect type determination module 520 further includes an image content type determination unit and a second to-be-applied effect type determination unit.

The image content type determination unit is configured to determine the image content type of the to-be-processed image.

The to-be-applied effect type second determination unit is configured to determine the at least one to-be-applied effect type from at least one to-be-selected effect type according to the image content type and a pre-established mapping relationship.

The mapping relationship includes each image content type and at least one to-be-selected effect type corresponding to each image content type.

On the basis of the preceding technical solutions, the effect selection information includes the to-be-processed image and the target text. The to-be-applied effect type determination module 520 further includes an effect type determination unit, a union determination unit, and an intersection determination unit.

The effect type determination unit is configured to determine a first effect type corresponding to the target text and a second effect type corresponding to the to-be-processed image.

The union determination unit is configured to determine a union including the first effect type and the second effect type to obtain the at least one to-be-applied effect type.

In another embodiment, the intersection determination unit is configured to determine an intersection of the first effect type and the second effect type to obtain the at least one to-be-applied effect type.

On the basis of the preceding technical solutions, the apparatus further includes an effect cover display module.

The effect cover display module is configured to, after the at least one to-be-applied effect type is determined, display an effect cover and text description that correspond to each to-be-applied effect type.

On the basis of the preceding technical solutions, the target effect type determination module 530 includes a target effect type first determination unit and a target effect type second determination unit.

The target effect type first determination unit is configured to determine the target effect type based on a trigger instruction on the at least one to-be-applied effect type.

In another embodiment, the target effect type second determination unit is configured to, when the trigger instruction on the at least one to-be-applied effect type is not detected within a preset duration, select the target effect type from the at least one to-be-applied effect type according to a preset manner.

The preset manner includes determining or presetting a default effect type randomly or according to the historical data of a target user.

On the basis of the preceding technical solutions, the apparatus further includes a transition animation playing module.

The transition animation playing module is configured to, after the target effect type is determined, play a transition animation before the target effect image is displayed.

On the basis of the preceding technical solutions, the apparatus further includes a progress bar display module.

The progress bar display module is configured to, in a process of playing the transition animation, display, in a target display position corresponding to the transition animation, a progress bar for producing the target effect image.

On the basis of the preceding technical solutions, the target effect image determination module 540 includes a target image determination unit and an image fusion processing unit.

The target image determination unit is configured to determine a target image associated with the target effect type.

The image fusion processing unit is configured to perform fusion processing for the target image and an association image associated with the target text and/or the to-be-processed image to obtain the target effect image.

On the basis of the preceding technical solutions, the apparatus further includes a filter parameter determination module. The filter parameter determination module is configured to, before the fusion processing is performed on the target image and the association image associated with the target text and/or the to-be-processed image to obtain the target effect image, determine a filter parameter corresponding to the target effect type to determine the target effect image based on the filter parameter.

On the basis of the preceding technical solutions, the image content type of the to-be-processed image and/or a keyword of the target text include at least one of an object type, a scene, a style type, or an environment.

According to the technical solution in this embodiment of the present disclosure, Effect selection information is acquired in response to an effect triggering instruction, at least one to-be-applied effect type corresponding to the Effect selection information is acquired, a target effect type is determined from the at least one to-be-applied effect type, and the target text and/or the to-be-processed image are converted into a target effect image corresponding to the target effect type. As such, a corresponding stylistic effect type is determined based on the image, the text, or a combination thereof. Further, the text and the image are converted into the effect of the target effect image based on the stylistic effect type, improving the accuracy of determining the corresponding stylistic effect type, further improving the image quality and effect display effect of the target effect image, improving the interactivity when the user uses an effect prop, and further improving user experience.

The video processing apparatus according to this embodiment of the present disclosure may execute the video processing method according to any embodiment of the present disclosure and has functional modules for and beneficial effects of the method performed.

It is to be noted that units/modules included in the preceding apparatus are divided according to function logic but are not limited to such division, as long as the corresponding functions can be achieved. Moreover, the specific names of function units/modules are used for distinguishing between each other and not intended to limit the scope of the embodiments of the present disclosure.

Figure 6:
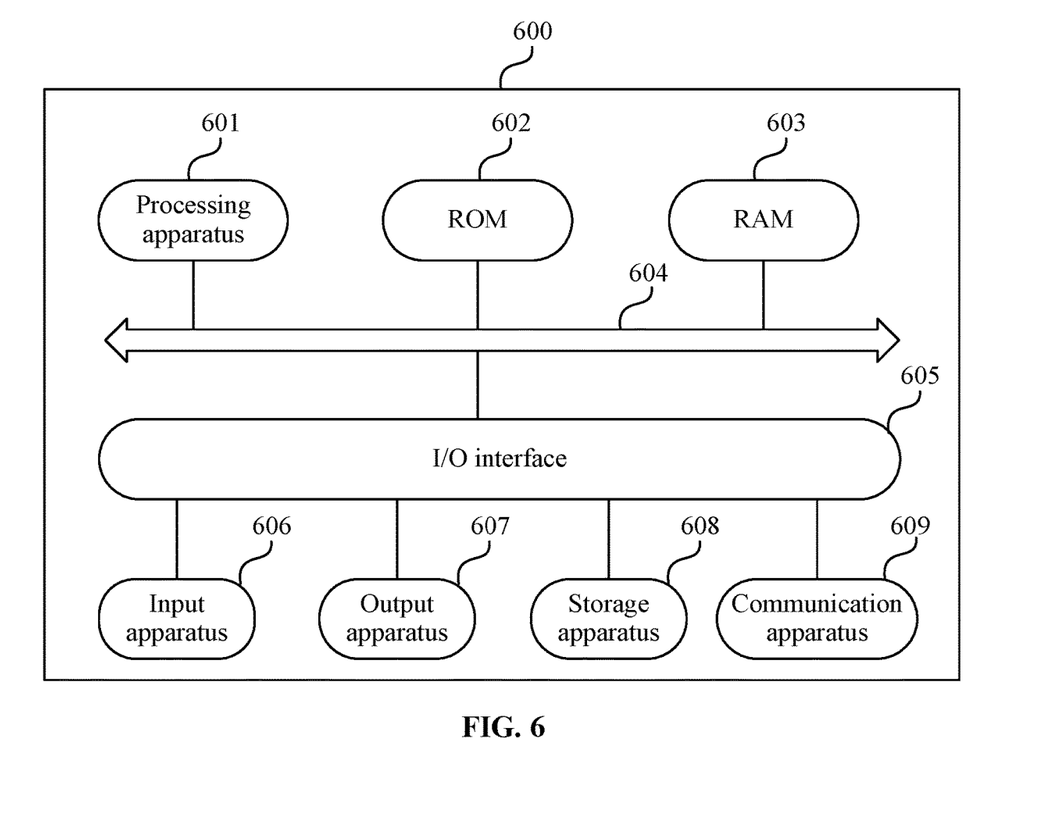
FIG. 6 is a structural diagram of an electronic device according to an embodiment of the present disclosure.

FIG. 6 is a structural diagram of an electronic device according to an embodiment of the present disclosure. FIG. 6 is a diagram illustrating the structure of an electronic device (for example, a terminal device or server in FIG. 6) 600 for implementing embodiments of the present disclosure. The terminal device of this embodiment of the present disclosure may include, but is not limited to, a mobile terminal such as a mobile phone, a laptop, a digital broadcast receiver, a personal digital assistant (PDA), a portable Android device (PAD), a portable media player (PMP), or an in-vehicle terminal (such as an in-vehicle navigation terminal); or a stationary terminal such as a digital television (TV) or a desktop computer. The electronic device shown in FIG. 6 is an example and is not intended to limit the function and use range of this embodiment of the present disclosure.

As shown in FIG. 6, the electronic device 600 may include a processing apparatus 601 (such as a central processing unit and a graphics processing unit). The processing apparatus 601 may execute various types of appropriate operations and processing based on a program stored in a read-only memory (ROM) 602 or a program loaded from a storage apparatus 608 to a random-access memory (RAM) 603. Various programs and data required for the operation of the electronic device 600 are also stored in the RAM 603. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 such as a touch screen, a touchpad, a keyboard, a mouse, a camera, a microphone, an accelerometer, or a gyroscope; an output apparatus 607 such as a liquid crystal display (LCD), a speaker, or a vibrator; the storage apparatus 608 such as a magnetic tape or a hard disk; and a communication apparatus 609. The communication apparatus 609 may allow the electronic device 600 to perform wireless or wired communication with other devices to exchange data. Although FIG. 6 illustrates the electronic device 600 having various apparatuses, it is to be understood that not all of the apparatuses illustrated herein need to be implemented or present. In another embodiment, more or fewer apparatuses may be implemented or present.

Particularly, according to embodiments of the present disclosure, the process described above with reference to a flowchart may be implemented as a computer software program. For example, a computer program product is included in the embodiment of the present disclosure. The computer program product includes a computer program carried on a non-transitory computer-readable medium. The computer program includes program codes for performing the methods shown in the flowcharts. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the method of the embodiments of the present disclosure are performed.

The names of messages or information exchanged between apparatuses in embodiments of the present disclosure are illustrative and not to limit the scope of the messages or information.

The electronic device provided in the embodiment belongs to the same inventive concept as the video processing methods provided in the preceding embodiments, and for the technical details not described in detail in the embodiment, reference may be made to the preceding embodiments, and the embodiment has the same beneficial effects as the preceding embodiments.

An embodiment of the present disclosure provides a non-transitory computer-readable storage medium storing a computer program. When the computer program is executed by processor, the video processing method according to any embodiment of the present disclosure is performed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal or any suitable combination thereof. The computer-readable signal medium may also be any computer-readable medium except the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an Ad-Hoc network), as well as any network currently known or to be developed in the future.

The preceding computer-readable medium may be included in the preceding electronic device or may exist alone without being assembled into the electronic device.

The computer-readable medium carries one or more programs which, when executed by the electronic device, cause the electronic device to perform the steps below.

The computer-readable medium carries one or more programs which, when executed by the electronic device, cause the electronic device to perform the steps below.

Effect selection information is acquired in response to an effect triggering instruction. The effect selection information includes at least one of target text, an image input feature, or a to-be-processed image.

At least one to-be-applied effect type corresponding to the Effect selection information is acquired.

A target effect type is determined from the at least one to-be-applied effect type.

The target text and/or the to-be-processed image are converted into a target effect image corresponding to the target effect type.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions shown in the blocks may occur in an order different from those shown in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The units/modules involved in the embodiments of the present disclosure may be implemented by software or hardware. The names of the units/modules do not constitute a limitation on the units/modules themselves. For example, a target effect image determination module may also be described as "a module for determining a target effect image".

The functions described above in the present disclosure may be executed, at least partially, by one or more hardware logic components. For example, the exemplary hardware logic components that may be used, may include but are not limited to: a sentence-piece-programmable gate array (FPGA), an application-specific integrated circuit (ASIC), an application-specific standard product (ASSP), a system on a chip (SOC), a complex programmable logic device (CPLD) and the like.

In the context of the present disclosure, the machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Concrete examples of the machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In a certain environment, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

What is claimed is:

1. A video processing method, comprising:
acquiring effect selection information in response to an effect triggering instruction, wherein the effect selection information comprises at least one of target text, an image input feature, or a to-be-processed image;
determining at least one to-be-applied effect type corresponding to the effect selection information;
determining a target effect type from the at least one to-be-applied effect type; and
converting at least one of the target text or the to-be-processed image into a target effect image corresponding to the target effect type,
wherein acquiring the effect selection information comprises:
acquiring the to-be-processed image,
wherein acquiring the to-be-processed image comprises:
displaying an image upload button in a display interface; and
when a trigger instruction on the image upload button is detected, displaying a target image library to acquire the to-be-processed image from the target image library; or, when the trigger instruction on the image upload button is not detected within a preset duration, acquiring the to-be processed image from at least one captured video frame.

2. The method according to claim 1, wherein acquiring the to-be-processed image from the at least one captured video frame comprises:
capturing a captured video frame at an end of a countdown as the to-be-processed image; or
acquiring the to-be-processed image based on a trigger instruction on at least one video frame captured within the preset duration.

3. The method according to claim 1, wherein acquiring the effect selection information comprises:
acquiring the target text,
wherein acquiring the target text comprises:
displaying a text input box to input the target text.

4. The method according to claim 1, wherein acquiring the effect selection information comprises:
determining the image input feature,
wherein determining the image input feature comprises:
determining the image input feature based on that an invoked camera is a front camera or a rear camera.

5. The method according to claim 1, wherein the effect selection information comprises the target text, and determining the at least one to-be-applied effect type corresponding to the effect selection information comprises:
performing word segmentation on the target text to determine at least one keyword corresponding to the target text; and
determining the at least one to-be-applied effect type from a plurality of to-be-selected effect types based on the at least one keyword.

6. The method according to claim 1, wherein the effect selection information comprises the to-be-processed image, and determining the at least one to-be-applied effect type corresponding to the effect selection information comprises:
determining image content type of the to-be-processed image; and
determining the at least one to-be-applied effect type from at least one to-be-selected effect type according to the image content type and a pre-established mapping relationship,
wherein the mapping relationship comprises each image content type and at least one to-be-selected effect type corresponding to the each image content type.

7. The method according to claim 1, wherein the effect selection information comprises the to-be-processed image and the target text, and determining the at least one to-be-applied effect type corresponding to the effect selection information comprises:
determining a first effect type corresponding to the target text and a second effect type corresponding to the to-be-processed image; and
determining a union comprising the first effect type and the second effect type to obtain the at least one to-be-applied effect type; or, determining an intersection of the first effect type and the second effect type to obtain the at least one to-be-applied effect type.

8. The method according to claim 1, after the at least one to-be-applied effect type is determined, further comprising:

displaying an effect cover and text description that correspond to each of the at least one to-be-applied effect type.

9. The method according to claim 1, wherein determining the target effect type from the at least one to-be-applied effect type comprises:
determining the target effect type based on a trigger instruction on the at least one to-be-applied effect type; or
when the trigger instruction on the at least one to-be-applied effect type is not detected within a preset duration, selecting the target effect type from the at least one to-be-applied effect type according to a preset rule,
wherein the preset rule comprises determining or presetting a default effect type randomly or determining or presetting a default effect type according to historical data of a target user.

10. The method according to claim 1, after determining the target effect type, further comprising:
playing a transition animation before displaying the target effect image.

11. The method according to claim 10, playing the transition animation comprises:
displaying, in a target display position corresponding to the transition animation, a progress bar for producing the target effect image.

12. The method according to claim 1, wherein converting the target text and/or the to-be-processed image into the target effect image corresponding to the target effect type comprises:
determining a target image associated with the target effect type; and
performing fusion processing for the target image and an association image associated with at least one of the target text or the to-be-processed image to obtain the target effect image.

13. The method according to claim 12, wherein before the fusion processing is performed on the target image and the association image associated with at least one of the target text or the to-be-processed image to obtain the target effect image, further comprising:
determining a filter parameter corresponding to the target effect type to determine the target effect image based on the filter parameter.

14. The method according to claim 6, wherein image content type of at least one of the to-be-processed image or the target text comprise at least one of:
an object type, a scene, a style type, or an environment of at least one of the to-be-processed image or the target text.

15. An electronic device, comprising:
one or more processors; and
a storage apparatus configured to store one or more programs,
wherein when executed by the one or more processors, the one or more programs cause the one or more processors to perform:
acquiring effect selection information in response to an effect triggering instruction, wherein the effect selection information comprises at least one of target text, an image input feature, or a to-be-processed image;
determining at least one to-be-applied effect type corresponding to the effect selection information;
determining a target effect type from the at least one to-be-applied effect type;
converting at least one of the target text or the to-be-processed image into a target effect image corresponding to the target effect type; and
acquiring the to-be-processed image,
wherein acquiring the to-be-processed image comprises:
displaying an image upload button in a display interface; and
when a trigger instruction on the image upload button is detected, displaying a target image library to acquire the to-be-processed image from the target image library; or, when the trigger instruction on the image upload button is not detected within a preset duration, acquiring the to-be processed image from at least one captured video frame.

16. The electronic device according to claim 15, wherein when executed by the one or more processors, the one or more programs cause the one or more processors to perform:
acquiring the target text,
wherein acquiring the target text comprises:
displaying a text input box to input the target text.

17. The electronic device according to claim 15, wherein when executed by the one or more processors, the one or more programs cause the one or more processors to perform:
determining the image input feature,
wherein determining the image input feature comprises:
determining the image input feature based on that an invoked camera is a front camera or a rear camera.

18. A non-transitory computer-readable storage medium comprising computer-executable instructions, wherein the computer-executable instructions are executed by a computer processor to perform:
acquiring effect selection information in response to an effect triggering instruction, wherein the effect selection information comprises at least one of target text, an image input feature, or a to-be-processed image;
determining at least one to-be-applied effect type corresponding to the effect selection information;
determining a target effect type from the at least one to-be-applied effect type; and
converting at least one of the target text or the to-be-processed image into a target effect image corresponding to the target effect type,
wherein acquiring the effect selection information comprises:
acquiring the to-be-processed image,
wherein acquiring the to-be-processed image comprises:
displaying an image upload button in a display interface; and
when a trigger instruction on the image upload button is detected, displaying a target image library to acquire the to-be-processed image from the target image library; or, when the trigger instruction on the image upload button is not detected within a preset duration, acquiring the to-be processed image from at least one captured video frame.

* * * * *